US005658630A

United States Patent [19]
Shizukuda et al.

[11] Patent Number: 5,658,630
[45] Date of Patent: Aug. 19, 1997

[54] MULTILAYER FOAMED PRESSURE SENSITIVE ADHESIVE AGENT AND METHOD FOR PRODUCTION THEREOF

[75] Inventors: Haruo Shizukuda; Noboru Koda, both of Machida, Japan

[73] Assignee: Minnesota Mining and Manufacturing Company, St. Paul, Minn.

[21] Appl. No.: 446,630

[22] PCT Filed: Dec. 17, 1993

[86] PCT No.: PCT/US93/12341

§ 371 Date: May 31, 1995

§ 102(e) Date: May 31, 1995

[87] PCT Pub. No.: WO94/14912

PCT Pub. Date: Jul. 7, 1994

[30] Foreign Application Priority Data

Dec. 18, 1992 [JP] Japan .................................. 4-338897

[51] Int. Cl.⁶ .................................................... C09J 7/02
[52] U.S. Cl. .......................... 428/40.1; 428/40.2; 428/40.3; 428/40.4; 428/40.5; 428/40.7; 428/40.8; 428/40.9
[58] Field of Search ..................... 428/40.1, 40.2, 428/41.3, 41.4, 41.5, 41.7, 41.8, 41.9; 427/208, 208.8

[56] References Cited

U.S. PATENT DOCUMENTS

| | | | |
|---|---|---|---|
| 4,181,752 | 1/1980 | Martens et al. | 427/54.1 |
| 4,223,067 | 9/1980 | Levens | 428/308 |
| 4,329,384 | 5/1982 | Vesley et al. | 428/40 |
| 4,330,590 | 5/1982 | Vesley | 428/336 |
| 4,839,206 | 6/1989 | Waldenberger | 428/40 |

FOREIGN PATENT DOCUMENTS

| | | |
|---|---|---|
| 1 155 750 | 10/1979 | Canada . |
| 0 084 220 | 7/1983 | European Pat. Off. . |
| 0 320 676 | 6/1989 | European Pat. Off. . |
| 0 319 155 B1 | 6/1989 | European Pat. Off. . |
| 0 324 242 | 7/1989 | European Pat. Off. . |
| 0 342 808 A1 | 11/1989 | European Pat. Off. . |
| 0 437 068 | 7/1991 | European Pat. Off. . |
| 1 192 357 | 5/1965 | Germany . |

*Primary Examiner*—Nasser Ahmad
*Attorney, Agent, or Firm*—Gary L. Griswold; Walter N. Kirn; Scott A. Bardell

[57] ABSTRACT

A double-faced adhesive tape excelling in susceptibility to perforation, heatproofness, and dimensional stability, and optionally incorporating a silicone pressure sensitive adhesive is provided.

4 Claims, 2 Drawing Sheets

MULTILAYER FOAMED PRESSURE SENSITIVE ADHESIVE AGENT AND METHOD FOR PRODUCTION THEREOF

This invention relates to a multilayer foamed pressure sensitive adhesive tape and to a method for the production thereof.

In recent years, foamed pressure sensitive adhesive tapes have been used in numerous applications such as attaching automobile parts, attaching glass sheets, and adhering metallic plates, because of their great adhesive force, light weight, low cost, and ease of handling.

BACKGROUND OF THE INVENTION

Japanese Examined Patent Publication No. 17,030/1982 discloses a pressure sensitive adhesive tape containing glass microbubbles. Japanese Unexamined Patent Publication No. 217,092/1989 discloses a foamed pressure sensitive adhesive tape containing pigment-coated microbubbles. Japanese Unexamined Patent Publication No. 18,485/1990 discloses an ultraviolet light polymerized acrylic pressure sensitive adhesive agent. U.S. Pat. No. 4,181,752 discloses a method for the formation of a sheet by interposing a liquid polymerizable substance between solid sheet materials and exposing the liquid polymerizable substance, to radiation, thereby polymerizing the substance.

The products of these inventions are characterized by enabling adhesive tapes to achieve an increase in wall thickness, acquire the ability to absorb a shock, enjoy light weight, exhibit strong adhesive force, ensure usability even on an irregular surface, and be produced by photopolymerization. They nevertheless are disadvantageous in that they exhibit little adhesiveness to silicone materials due to the use of an acrylic adhesive agent, show poor susceptibility to perforation, and exhibit low dimensional stability.

Moreover, U.S. Pat. No. 4,839,206 discloses a pressure sensitive adhesive tape wherein one or both of the sides of a foam substrate is laminated with a pressure sensitive adhesive not containing a filler, but this tape does not have a material providing a mechanical reinforcing effect. Therefore, similar to the above-mentioned adhesive tape, it has the drawbacks of poor susceptibility to perforation, low hardness, poor dimensional stability, etc.

Heretofore, a foamed double-faced pressure sensitive adhesive tape has been produced by a method which comprises interposing an acrylic foam substrate monomer or oligomer in the form of a layer between two transparent release sheets, exposing the monomer or oligomer layer to an ultraviolet light, thereby polymerizing the monomer or oligomer and giving rise to an acrylic foam substrate, then peeling one of the transparent release sheets, and attaching fast a laminate formed of a product release sheet and an acrylic pressure sensitive adhesive.

The other surface of the acrylic foam substrate is subjected to the same treatment as described above, resulting in a multilayer pressure sensitive adhesive sheet having acrylic type pressure sensitive adhesive layers formed one each on the opposite surfaces of the acrylic foam substrate and product release sheets attached further to the outer sides of the pressure sensitive adhesive layers. The multilayer pressure sensitive adhesive sheet, optionally, is wound up in a roll after one of the product parting sheets has been separated. At the time that this roll is put to use, the remaining product release sheet is peeled off.

For the multilayer pressure sensitive adhesive tape possessing a foamed substrate, the acrylic foam substrate is used most desirably as the foamed substrate from the practical point of view. When the multilayer pressure sensitive adhesive tape is to be produced by the aforementioned method using this acrylic foam substrate, lamination of a silicone type pressure sensitive adhesive is attained only with difficulty. The reason for this difficulty is that when the silicone type adhesive agent is applied to the acrylic foam substrate in accordance with the method described above, the silicone type adhesive agent exhibits inferior adhesivity to the acrylic foam substrate and tends to separate as attached fast to the release sheet. There further exist such disadvantages as inferior dimensional stability of the adhesive agent, poor susceptibility to perforation, and absence of hardness.

Therefore, an object of the invention is to provide a multilayer pressure sensitive adhesive agent which is free from the various drawbacks possessed by the conventional multilayer pressure sensitive adhesive agent as described above.

BRIEF DESCRIPTION OF THE INVENTION

As illustrated in FIG. 1A, the present invention provides a multilayer foamed pressure sensitive adhesive tape having a foamed layer (4), a flexible film (3), a pressure sensitive adhesive or other adhesive (2), and a release material (1) laminated sequentially in the order mentioned. The foamed layer (4) is preferably a foamed pressure sensitive adhesive and the flexible film (3), release material (1), and adhesive (2) are preferably transparent to ultraviolet radiation.

As illustrated in FIG. 1B, the present invention also provides a multilayer foamed pressure sensitive adhesive tape having a pressure sensitive adhesive (6), a foamed substrate or foamed pressure sensitive adhesive agent (5), a flexible film (3), a transparent pressure sensitive adhesive agent or transparent adhesive (2), and a transparent release material (1) laminated sequentially in the order mentioned. The flexible film (3) is preferably transparent.

As illustrated in FIG. 2, the present invention further provides a method for the production of a multilayer foamed pressure sensitive adhesive tape illustrated in FIG. 1A, which method is characterized by injecting a foaming monomer or oligomer solution or syrup (5) between a laminate (10) comprising a transparent flexible film (3), a transparent pressure sensitive adhesive or adhesive layer (2), and a transparent release material (1), and another transparent release material (7) opposed to the transparent flexible film (3), exposing the pressure sensitive adhesive monomer or oligomer (5) to an ultraviolet light through the transparent laminate (10) and/or the transparent release material, thereby polymerizing the monomer or oligomer and forming a foamed layer. The foaming monomer or oligomer solution or syrup preferably produces a foamed pressure sensitive adhesive layer.

As noted above, the foaming monomer or oligomer solution or syrup is preferably exposed to ultraviolet light from both sides, but the light may optionally come from only the laminate (10) side or the release material (7) side. Therefore, embodiments of this invention include those in which one of the laminate (10) and the release material (7) is not transparent to ultraviolet light.

Further, as illustrated in FIGS. 2 and 3, the present invention provides a method for the production of a multilayer foamed pressure sensitive adhesive tape, characterized by injecting a foaming substrate or foaming pressure sensitive adhesive monomer or oligomer solution or syrup (5) between a laminate (10) comprising a transparent flexible film (3), a transparent pressure sensitive adhesive or adhesive layer (2), and a transparent release material layer (1) and another transparent release material (7) opposed to the transparent flexible film (3), exposing the foaming substrate monomer or oligomer (5) to an ultraviolet light through the transparent release material (1) and/or transparent release material (7) thereby polymerizing the monomer or oligomer and forming a foamed substrate or foamed pressure sensitive adhesive (5), and removing the transparent release material (7) thereby enabling attachment of the pressure sensitive adhesive (5). The attachment of the pressure sensitive adhesive (6) is shown in FIGS. 4 and 5.

In one embodiment of the present invention, a transparent pressure sensitive adhesive (6) may be preparatorily applied to the other release material layer (7) and then exposed to the ultraviolet light. This method obviates the necessity for discarding the other release material layer (7), decreases the number of steps of operation, and contributes to enhancing the efficiency of production.

DESCRIPTION OF REFERENCE NUMERALS

Figure 1A:
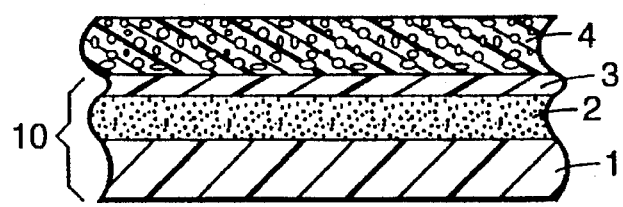
FIGS. 1A and 1B illustrate cross-sections of multilayer foamed pressure sensitive adhesive tapes as first and second embodiments of the present invention.
Figure 1B:
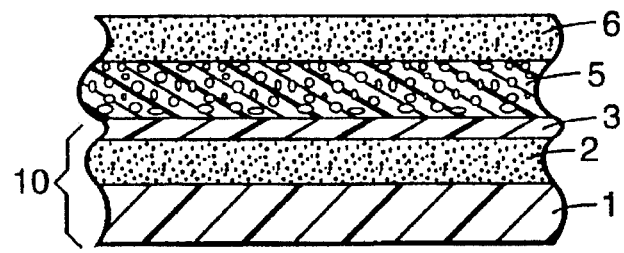
Figure 2:
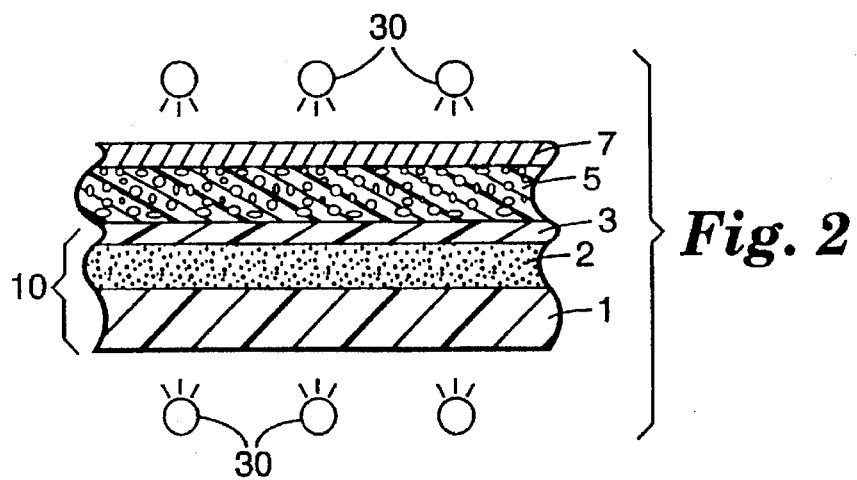
FIG. 2 illustrates a process for manufacture of a multilayer foamed pressure sensitive adhesive tape, depicting the formation of a foamed substrate by polymerization of a foamed substrate-forming monomer or oligomer (5) by exposure to an ultraviolet light from a light source (30).
Figure 3:
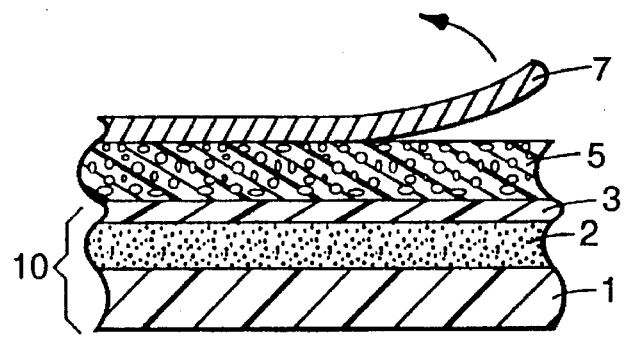
FIG. 3 illustrates a process for the removal of a transparent release material (7) subsequent to the process of FIG. 2.
Figure 4:
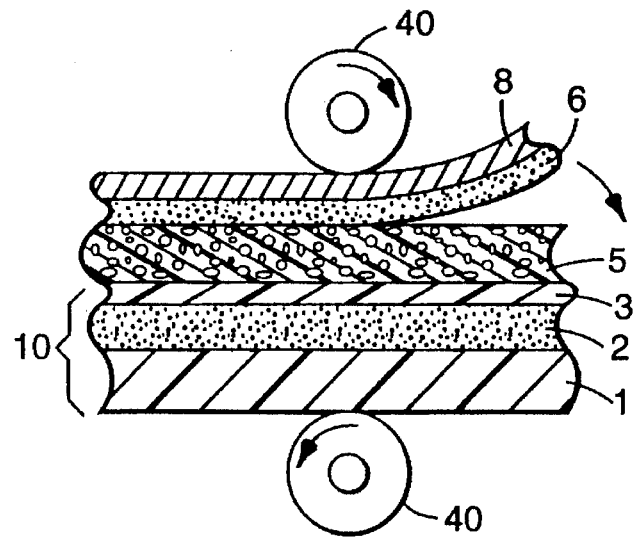
FIG. 4 illustrates a process for the fast attachment of a release material (8) coated with a transparent pressure sensitive adhesive (6) to a foamed substrate (5) by the use of a roller (40).
Figure 5:
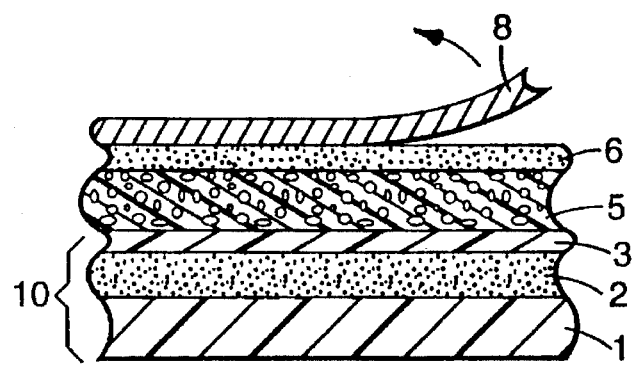
FIG. 5 illustrates a process for the removal of the release material (8) after the attachment of the pressure sensitive adhesive (6) to the foamed substrate (5) subsequent to the process of FIG. 4.

1 - - - Transparent release material
2 - - - Transparent pressure sensitive adhesive or transparent adhesive
3 - - - Transparent flexible film
4 - - - Foamed pressure sensitive adhesive agent layer
5 - - - Foamed substrate or foamed pressure sensitive adhesive
6 - - - Pressure sensitive adhesive
7 - - - Release material
8 - - - Release material
10 - - - Transparent laminate
11 - - - Primer layer
12 - - - Primer layer

DETAILED DESCRIPTION OF THE INVENTION

As a first embodiment, the multilayer pressure sensitive adhesive agent of the present invention has a foamed pressure sensitive adhesive agent, a transparent flexible film, a transparent pressure sensitive adhesive or transparent adhesive agent, and a transparent material in the order mentioned.

Foamed pressure sensitive adhesive agents are disclosed in U.S. Pat. No. 4,223,067 and Japanese Unexamined Patent Publications Nos. 195,037/1989, 217,092/1989, and 18,485/1990. They are produced by interposing a foamed pressure sensitive adhesive agent-forming monomer or oligomer between a substrate consisting of a transparent flexible film, a transparent tackiness agent or transparent adhesive agent, and a transparent release material and another transparent release material and exposing the monomer or oligomer to ultraviolet light.

As the monomer or oligomer, any of the monomers or oligomers mentioned in Japanese Unexamined Patent Publication No. 195,037/1989, can be used. Specifically, isooctyl acrylate, isononyl acrylate, 2-ethyl-hexyl acrylate, decyl acrylate, dodecyl acrylate, n-butyl acrylate, and hexyl acrylate may be used. As the polymerization catalyst, any of the common photopolymerization catalysts may be used. Specifically, such substituted $\alpha$-ketols as benzoin methyl ether, benzoin isopropyl ether, substituted benzine ether, 2,2-diethoxy acetophenone, and 2-methyl-2-hydroxypropiophenone may be used.

The polymerization catalyst should be added in a catalytically effective amount; it is preferably selected in the range of from 0.01 to 1 part by weight based on 100 parts by weight of the monomer or oligomer in due consideration of such factors as polymerization velocity and molecular weight.

A cross-linking agent may be used to enhance the cohesive force of the adhesive. Specifically, examples of suitable cross-linking agents include hydrogen-extracting carbonyl compounds such as anthraquinone, benzophenone, 1,6-hexane diol acrylate, 1,2-ethylene glycol acrylate, and substituted halomethyl-s-triazines, which are listed in U.S. Pat. No. 4,330,590 or U.S. Pat. No. 4,329,384.

Preferably, the monomer or oligomer has its viscosity adjusted to a level in the range of from 500 to 5,000 cps and is subjected to photopolymerization by exposure to ultraviolet light having not less than 90% of the wavelength in the range of from 300 to 400 nm at a luminous intensity of 0.4 watt/cm$^2$.

The monomer or oligomer is made to form a foamed pressure sensitive adhesive agent layer by adding a suitable amount of glass bubbles to the monomer or oligomer and/or blowing nitrogen therein in the process of such polymerization.

The foamed pressure sensitive adhesive agent layer thus obtained combines the function of a foamed substrate with that of an adhesive agent. The thickness of the foamed adhesive layer is preferably in the range of from 0.1 mm to 10 mm, preferably from 0.15 mm to 5 mm. If this thickness is less than 0.1 mm, the disadvantage arises that the characteristic properties (adhesivity force and shearing force) of a foamed adhesive agent are not acquired, no sufficient adhesive force is manifested on a jogging surface, and such additives as microbubbles give a roughened surface to the layer produced. Conversely, if the thickness exceeds 10 mm, the ultraviolet light produces an insufficiently cross-linked structure, production conditions must be extremely rigid, and the product suffers from inconsistency of adhesive force, etc.

Materials suitable for use as the transparent release materials for coating the monomer or oligomer in the aforementioned process of exposure to the ultraviolet light include polyester film, transparent acrylic film, polypropylene film, polyethylene film, polyvinyl chloride film, polyvinylidene chloride film, polyphenylene sulfide fluorine resin film, polyvinyl acetate film, polyamide film, and polyimide film. In all these release materials, polyester proves to be most desirable from the standpoint of physical properties and chemical properties. The thickness of this film is preferably in the range of from 1 to 200 μm, more preferably from 50 to 100 μm. If this thickness is less than 1 μm, the film is peeled or handled only with difficulty. Conversely, if the thickness exceeds 200 μm, the film absorbs the ultraviolet light excessively and it is wound into a roll with difficulty.

The transparent flexible films which may be used include polyester film, transparent polyacrylic film, polypropylene film, polyethylene film, polyvinyl chloride film, polyvinylidene chloride film, polyphenylene sulfide, fluorine type resin film, polyvinyl acetate film, polyamide film, and polyimide film. For ultraviolet radiation processing, the film is preferably transparent to ultraviolet radiation. In all these transparent flexible films, polyester film proves to be particularly desirable from the standpoint of transparency, cost, physical properties, and chemical properties.

The thickness of this transparent flexible film is in the range of from 1 to 50 μm, preferably from 5 to 25 μm. If this thickness is less than 1 μm, the film tends to succumb to thermal deformation in the process of primer treatment, which will be described more specifically below, the film is handled with difficulty (for example, during the primer treatment, the application of the transparent pressure sensitive adhesive, and the lamination with the parting material), the film tends to gather wrinkles, and an insufficient improvement is attained in perforability and heatproofness. Conversely, if the thickness exceeds 50 μm, the film permits no easy perforation, the film follows the contours of an irregular surface poorly, and the film is wound into a roll only with difficulty.

Figure 6:
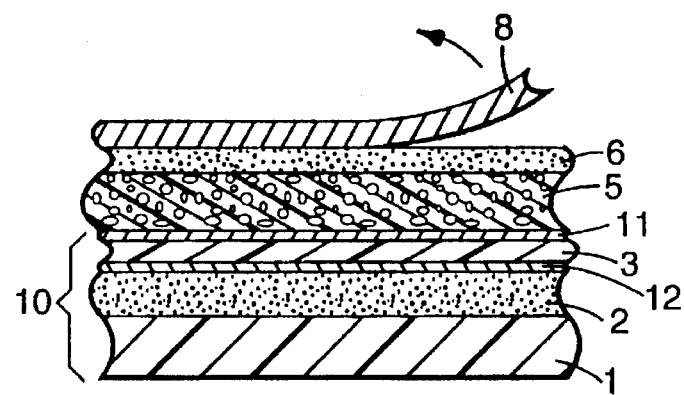
FIG. 6 illustrates the presence of primer layers 11 and 12 on both sides of the transparent flexible film in the multilayer foamed pressure sensitive adhesive tape shown in FIG. 5.

The transparent flexible film is preferably subjected to the primer treatment (primer layers 11 and 12 in FIG. 6) to improve its adhesivity to the transparent pressure sensitive adhesive or transparent adhesive agent and its adhesivity to the foaming pressure sensitive adhesive agent. Suitable primers include isocyanate and organic poly-siloxane primers. Specifically, the primers which may be used for the treatment include BY24-712 (product of Toray-Dow Coming K.K.), 3006A (product of Shin'Etsu Chemical Industry Co., Ltd.), and isocyanate type primers represented by Scotch™ Brand Primer C-100 (product of Sumitomo-3M K.K.). The primer treatment can be carried out by the use of a gravure coater, a roll coater, or a knife coater as popularly practiced in the art.

The transparent pressure sensitive adhesives or transparent adhesives which may be used include silicone type pressure sensitive adhesives, transparent acrylic type pressure sensitive adhesives, rubber type pressure sensitive adhesives, vinyl acetate type pressure sensitive adhesives, urethane type adhesives, epoxy adhesives, transparent phenol adhesives, synthetic rubber adhesives, natural rubber adhesives, polyester type adhesives, polyamide type adhesive agents, and PVA type adhesive agents. These agents may be used either singly or in a suitable combination. The thickness of the transparent pressure sensitive adhesive or transparent adhesive layer is in the range of from 2 to 100 μm, preferably from 5 to 50 μm. If the thickness of the film is less than 2 μm, the layer acquires insufficient adhesiveness to the surface being coated. Conversely, if the thickness exceeds 100 μm, the layer is produced with difficulty and succumbs to perforation with difficulty.

The formation of the substrate consisting of the transparent flexible film, the transparent pressure sensitive adhesive or transparent adhesive agent, and the transparent release material is effected, for example, by applying the transparent pressure sensitive adhesive or transparent adhesive agent to the transparent flexible film as with a reverse coater, a roll coater, or a plate coater, and then laminating the transparent releasing agent thereon as commonly practiced in the art.

The laminate which is produced by the aforementioned exposure to the ultraviolet light is provided with transparent release materials, one each on the opposite outermost surfaces thereof. In one embodiment of the present invention, the laminate can be wound into a roll after one of the two release materials, e.g., the transparent release material adjoining the foamed pressure sensitive adhesive agent, has been removed.

As a second embodiment of the invention, the multilayer pressure sensitive adhesive tape has a pressure sensitive adhesive (6), a foamed substrate (5), a transparent flexible film (3), a transparent pressure sensitive adhesive or transparent adhesive (2), and a transparent release material (1) laminated in the order mentioned. It is produced by injecting a foamed substrate-forming monomer or oligomer (5) between the laminate (10) consisting of the transparent flexible film (3), the transparent pressure sensitive adhesive or transparent adhesive (2), and the transparent release material (1) and the other transparent release material (7), exposing the monomer or oligomer to an ultraviolet light from a light source (30), thereby forming the foamed substrate (5), then peeling the transparent release material (7) adjoining the foamed substrate (5), and causing the release material (8) coated with the pressure sensitive adhesive (6) to be applied to the freshly exposed surface of the foamed substrate, thereby creating contact between the surface of the foamed substrate and the pressure sensitive adhesive layer (6).

The release material involved in the second embodiment is identical with what has been described for the first embodiment. Further, the substrate (10) of this second embodiment consisting of the release material, the transparent pressure sensitive adhesive agent or transparent adhesive and the release material is likewise identical with what has been described for the first embodiment.

For the foamed substrate, a polyethylene or polyurethane type monomer or oligomer can be used as the foamed substrate-forming monomer or oligomer. The foamed substrate may be a pressure sensitive adhesive substrate, formed from the same monomer or oligomer as mentioned above. Foams that are not tacky may be adhered to the other layers with an adhesive, e.g., a urethane pressure sensitive adhesive or a urethane laminating adhesive.

The thickness of the foamed substrate is desirably in the range of from 0.1 to 10 min. If this thickness is less than 0.1 mm, the disadvantage arises that the substrate produced exhibits poor adhesivity to an irregular surface and develops a roughened surface because of the prominence of microbubbles used as an additive. Conversely, if the thickness exceeds 10 mm, the exposure to ultraviolet light fails to produce a sufficiently crosslinked structure in the foamed substrate and the production conditions must be extremely rigid.

When the foamed substrate is made of urethane foam, the pressure sensitive adhesive to be applied to the release material which is attached to the foamed substrate after its formation is preferably the same urethane type pressure sensitive adhesive used in the foamed substrate. The lamination of the release material coated with the pressure sensitive adhesive on the foamed substrate can be effected by the use of a reverse coater, roll knife coater, or plate coater.

The multilayer pressure sensitive adhesive film which is obtained as described above is furnished with release materials, one each on the opposite outer surfaces thereof. In one embodiment of the present invention, the multilayer adhesive film can be wound into a roll after removal of one of these two release materials.

This invention will be described more specifically below with reference to a working example.

EXAMPLE

A substrate (10) consisting of a transparent flexible film, a transparent pressure sensitive adhesive, and a transparent release material was produced as follows.

A transparent flexible film was obtained by applying a primer for a silicone pressure sensitive adhesive (a combination of 100 parts of X-40-3006A, 2 parts of X-40-3006B, and 1 part of a catalyst, PS-1, produced by Shin'Etsu Chemical Industry Co., Ltd.) to one side of a transparent flexible polyester film (a biaxially stretched film produced by Unitika Ltd. and marketed under trademark designation of "Emblet"; 0.5, 6, 12, 25, or 100 μm in thickness), drying the applied layer of the primer at 80° C. for one minute, then applying a primer (produced by Sumitomo-3M K.K. and marketed under product code of "C-100") to the other side of the polyester film, and drying the applied layer of the primer for one minute.

Then, a silicone pressure sensitive adhesive (a combination of 100 parts of X-40-3004A and 3 parts of DX3004, produced by Shin'Etsu Chemical Industry Co., Ltd.) was applied to the side of the primer-treated polyester film coated with a primer for the silicone pressure sensitive adhesive and the applied layer of the pressure sensitive adhesive was dried at 130° C. for one minute. The thickness of the silicone pressure sensitive adhesive layer was 1, 5, 15, 50, or 70 μm.

Then, a transparent release material was produced by applying a release material for a silicone tackiness (a combination of 100 parts of X-70-201 and 0.5 part of a catalyst, C-PL-50T, produced by Shin'Etsu Chemical Industry Co., Ltd.) to one side of a polyester film (a biaxially stretched polyester film 75 μm in thickness, produced by Unitika K.K. and marketed under trademark designation of "Emblet"), drying the applied layer of the release agent at 150° C. for one minute, then applying a silicone release agent (a combination of 100 parts of X1-2-2418 and 1 part of a catalyst, PL-50T, produced by Shin'Etsu Chemical Industry Co., Ltd.) with a wire bar to the other side of the polyester film, and drying the applied layer of the release agent at 100° C. for 30 minutes.

Subsequently, a substrate consisting of a transparent flexible film (polyester film), a transparent pressure sensitive adhesive (silicone pressure sensitive adhesive), and a transparent release material (polyester film treated with silicone for separation) was produced by laminating the polyester film coated with the silicone pressure sensitive adhesive on the transparent release material mentioned above in such a manner as to create contact between the silicone pressure sensitive adhesive on the polyester film and the side of the transparent release material treated with a release agent for the silicone pressure sensitive adhesive X70-201.

A mixture consisting of 87.5 parts by weight of isooctyl acrylate, 12.5 parts by weight of acrylic acid, and 0.04 part by weight of 2,2-dimethoxy-2-phenyl acetophenone was partially polymerized to a syrup having a viscosity of 1,000 cps, and further combined with 0.1 part by weight of 2,4-dimethoxy-2-phenyl acetophenone, 0.05 part by weight of hexanediol diacrylate, 10 parts by weight of glass bubbles (C250, sold by Minnesota Mining and Manufacturing Co.), and 5 parts by weight of hydrophobic silica.

The components thus combined were thoroughly mixed by stirring. The resultant mixture was supplied to the space intervening between the substrate comprising the transparent flexible film, the transparent pressure sensitive adhesive and the transparent release material and the transparent release material of silicone-treated polyethylene terephthalate film so as to give rise to a layer 0.3 to 0.4 mm in thickness.

The transparent release material was separated from the foam after the layer of the mixture was irradiated with the ultraviolet light from a UV lamp having an average wavelength of 350 nm to a total energy of about 555 mj/cm$^2$ and an average intensity of about 0.7 mW/cm$^2$. The mixture was first irradiated at an intensity of about 0.2 mW/cm$^2$ and then the irradiation was increased to an intensity of about 1.8 mW/cm$^2$. The remaining foam was wound into a roll. Thus, a multilayer foamed pressure sensitive adhesive tape was completed.

The multilayer foamed pressure sensitive adhesive produced as described above was tested for adhesive force on silicone rubber. For comparison, a conventional countertype (an acrylic foam provided with acrylic pressure sensitive adhesive layers one each on the opposite sides thereof, produced by Sumitomo-3M K.K. and marketed under the tradename "Scotch™ EPVHB Acrylic Foam Tape Y-4920") was similarly tested for adhesivity to silicone rubber. This test was carried out by attaching the silicone pressure sensitive adhesive layer of the multilayer foamed pressure sensitive tape fast to the surface of a silicone rubber sheet (2 mm thick×50 mm×150 mm; produced by Iruma Rubber K.K. and marketed under product code of "IS-825"), attaching an aluminum foil as a backing material fast to the acrylic foam layer side of the multilayer foamed pressure sensitive adhesive tape, causing a rubber roller weighing 2 kg to be reciprocated just once on the produced laminate, and allowing the laminate to stand at a varying temperature indicated in Table 1 for a prescribed duration.

In a tensile tester, the silicone rubber sheet was set fast horizontally with a lower chuck and the multilayer foamed pressure sensitive adhesive tape lined with the alumina foil was set fast with an upper chuck and the tape was peeled off the silicone rubber sheet in a direction of 90° at a speed of 300 mm/min to determine the adhesive force (g/25 mm). The results were as shown in Table 1 below.

TABLE 1

| | Product of this invention | | | | | Conventional product |
|---|---|---|---|---|---|---|
| | Thickness of silicon tackiness agent layer (μm) | | | | | |
| Standing conditions | 1 | 5 | 15 | 50 | 70 | |
| 23° C., 20 min | 52 | 300 | 410 | 508 | 720 | 10 |
| 23° C., 72 hr | 65 | 430 | 609 | 670 | 905 | 10 |
| 80° C., 48 hr | 55 | 580 | 790 | 1010 | 1300 | 10 |

The multilayer foamed pressure sensitive adhesive tapes containing a flexible film of a varying thickness were tested for susceptibility to perforation, kiss-cut property, and heat-proofness as follows.

Susceptibility to perforation: A sample was cut with a dumbbell punching device at a pressure of 20 kgf/cm$^2$ in accordance with JIS (Japanese Industrial Standard) K-6301 with necessary modifications to determine whether or not the sample produced a dumbbell No. 3 in consequence of the operation of the device. The results were evaluated on the three-point scale, wherein:

x for total absence of perforation

Δ for partial absence of perforation o for perfect perforation

Kiss-cut property: A sample tape was cut with a knife and the fresh section of cutting was observed under an optical microscope. The results were evaluated on the three-point scale, wherein:

x for exudation of pressure sensitive adhesive

Δ for slight exudation of pressure sensitive adhesive o for total absence of exudation of pressure sensitive adhesive Heatproofness: A sample tape was heated in an oven at 140° C. for five minutes and, at the end of the heating, examined for a sign of deformation, if any. The results were evaluated on the three-point scale, wherein:

x for complete deformation

Δ for slight deformation o for total absence of deformation

The results are shown in Table 2 below.

TABLE 2

| Thickness of flexible film (μm) | 0.5 | 6 | 12 | 25 | 100 |
|---|---|---|---|---|---|
| Adhesive force (23° C., g/25 mm) | 510 | 515 | 502 | 450 | 425 |
| Susceptibility to perforation | o | o | o | o | x |
| Kiss-cut property | Δ | o | o | o | o |
| Heatproofness | x | o | o | o | o |

We claim:

1. A multilayer foamed pressure sensitive adhesive tape comprising a foamed acrylate pressure sensitive adhesive layer, a transparent polyester flexible film having a thickness of from 1 to 50 μm, a silicone adhesive, and a transparent release material laminated in the order mentioned.

2. A multilayer foamed pressure sensitive adhesive tape comprising a pressure sensitive adhesive, a foamed substrate or foamed acrylate pressure sensitive adhesive, a transparent polyester flexible film having a thickness of from 1 to 50 μm, a silicone adhesive, and a transparent release material laminated in the order mentioned.

3. A multilayer foamed pressure sensitive adhesive tape according to claim 1 or claim 2, wherein either or both of the opposite surfaces of said transparent flexible film have been treated with a transparent primer.

4. A multilayer foamed pressure sensitive adhesive tape according to claim 1 or 2, wherein the thickness of said foamed pressure sensitive adhesive agent or foamed substrate is in the range of from 0.1 to 10 mm, the thickness of said transparent polyester flexible film is in the range of from to 50 μm, the thickness of said pressure sensitive adhesive is in the range of from 2 to 100 μm, and the thickness of said release film is in the range of from 1 to 200 μm.

* * * * *

UNITED STATES PATENT AND TRADEMARK OFFICE
CERTIFICATE OF CORRECTION

PATENT NO. : 5,658,630
DATED : August 19, 1997
INVENTOR(S) : Haruo Shizukuda et al.

It is certified that error appears in the above-identified patent and that said Letters Patent is hereby corrected as shown below:

Col. 6, line 50, "0.1 to 10 min" should read -- 0.1 to 10 mm --.

Col. 8, line 11, "IJV lamp" should read -- UV lamp --.

Col. 10, line 21, delete "agent".

Signed and Sealed this

Seventeenth Day of March, 1998

Attest:

BRUCE LEHMAN

Attesting Officer

Commissioner of Patents and Trademarks